3,304,225
PESTICIDAL METHODS AND COMPOSITIONS
Karoly Szabo, Orinda, and David J. Broadbent, San Jose, Calif., assignors to Stauffer Chemical Company, New York, N.Y., a corporation of Delaware
No Drawing. Filed Sept. 29, 1965, Ser. No. 491,444
12 Claims. (Cl. 167—30)

This invention relates to certain new and novel substituted phenyl carbamates and their use as effective insecticides. More specifically, this invention relates to certain N-methyl nuclear-substituted phenyl carbamates and to utility of said substituted phenyl carbamates in insecticidal compositions.

The compounds comprising the instant class of insecticides correspond to the general formula

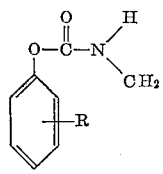

wherein R is a member selected from the group consisting of meta-oriented lower alkylthioalkoxy, para-oriented cyanomethyl and cyanoethyl, and 2,3-oriented ethylenedioxy. The 2,3-oriented ethylenedioxy may also be alkylated further with a lower alkyl radical containing from 1 to 4 carbon atoms, as described in Examples 4 and 5. Also included is a method of preparing, using, and applying said compositions.

The compounds herein mentioned and whose insecticidal utility is contemplated can be prepared by several methods. The most convenient method applied in preparing the compounds was the reaction between the appropriate substituted hydroxy aryl compound and methyl isocyanate. The reaction proceeds readily in the liquid phase. The employment of an inert organic solvent, e.g., chloroform, ether, dioxane or acetone, was also useful, facilitating processing as well as agitation of the reactants. A tertiary amine, preferably triethylamine, was used in catalytic amounts to promote the reaction. Temperatures that permit operation in the liquid phase and which are between room temperature and reflux temperature of the solvent, if one is used, are employed generally. Preferably the reaction mixture is refluxed for a short time, usually at an elevated temperature. In most cases the reactions were exothermic so that added heat was unnecessary.

Compounds of the present invention may be made in accordance with the following non-limiting examples.

EXAMPLE 1

*Preparation of N-methyl-(m-methylthiomethoxy) phenyl carbamate* m-(Methylthiomethoxy) phenol (11.5 g.) was dissolved in 60 ml. of chloroform. To the solution was added 4.0 g. of methyl isocyanate. Several drops of the tertiary amine catalyst, triethylamine, was added. There began an exothermic and spontaneous reaction. The reaction mixture was allowed to stand and cool to room temperature over a period of an hour. The volatile materials were removed in vacuo. There was obtained 14 g. of a brown oil as a crude product. This was recrystallized from methanol with the aid of a dry ice bath to obtain a white solid product, M.P. 70–72° C. Elemental analysis confirmed the expected structure.

EXAMPLE 2

*Preparation of N-methyl-(4-cyanoethyl) phenyl carbamate*

In a similar manner as described in the above reaction, 13.5 g. of 4-hydroxypropionitrile was dissolved in 70 ml. of chloroform that also contained 0.05 ml. of triethylamine catalyst. To this solution was added dropwise 6.0 g. of methyl isocyanate. A mild exothermic reaction began. Addition was completed and the mixture was refluxed for an additional hour. The product was precipitated from the chloroform solution by adding 100 ml. of hexane. There was obtained 15.1 g. of a white solid, M.P. 117–8° C. Elemental analysis confirmed the expected structure.

EXAMPLE 3

*Preparation of 5-(N-methylcarbamoyloxy) benzodioxane*

5-hydroxybenzodioxane (7.6 g.) was dissolved in 30 ml. of chloroform and 3 g. of methyl isocyanate was added to this solution. No reaction took place. However, when a catalytic amount of triethylamine was added a vigorous exothermic reaction took place. The reaction mixture was allowed to cool to room temperature. The addition of several milliliters of hexane started the crystallization of the product at room temperature. After the mixture had completely solidified, 30 ml. of hexane was added to facilitate filtration of the product. There was obtained 10.1 g. of a wihte solid, M.P. 167.5° C. Elemental analysis confirmed the expected structure.

EXAMPLE 4

*Preparation of 5-(N-methylcarbamoyloxy)-ethylbenzodioxane*

Similarly the compounds 2 and 3-ethyl-5-hydroxy-benzodioxane, obtained by reacting pyrogallol di-sodium salt with 1,2-dichlorobutane, were reacted with methyl isocyanate to prepare the title compounds. Because of the nature of the reaction in preparing the starting material there results two isomers, the 2-ethyl and 3-ethyl-5-hydroxy-benzodioxane. The separation of these isomers is very difficult, therefore the carbamate was prepared from the mixture of isomers. No attempt was made to separate and purify the respective carbamates. The product was bioassayed as a mixture without further separation. Infrared examination showed the expected structures to be present.

EXAMPLE 5

*Preparation of 5-(N-methylcarbamoyloxy)-methylbenzodioxane*

In a similar manner as described in Example 4, 2-methyl and 3-methyl-5-hydroxy-benzodioxane were reacted with methyl isocyanate to prepare the title compounds. Separation of the isomers was very difficult, therefore the product was bioassayed as a purified mixture.

The following is a table of the compounds prepared according to the aforedescribed procedure. Compound numbers have been assigned to each compound and are then used for identification throughout the balance of the application.

TABLE I

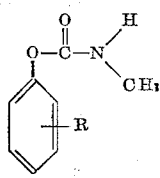

| Compound number | Substituent orientation | R | $n_D^{22}$ or M.P. (° C.) |
|---|---|---|---|
| 1* | Meta | Methylthiomethoxy | 70–2° |
| 2 | Meta | Isopropylthiomethoxy | 1.5480 |
| 3 | Meta | Methylthioethoxy | 1.5530 |
| 4 | Meta | Ethylthiomethoxy | (¹) |
| 5 | Para | Cyanomethyl | 132–4° |
| 6* | Para | Cyanoethyl | 117–8° |
| 7* | 2,3 | Ethylenedioxy | 167.5° |
| 8* | 2,3 | Ethylethylenedioxy | (²) |
| 9* | 2,3 | Methylethylenedioxy | (²) |

¹ Liquid.
² Semi-solid.
*Compound No. 1 prepared in Example 1; Compound No. 6 prepared in Example 2; Compound No. 7 prepared in Example 3; Compound No. 8 prepared in Example 4; Compound No. 9 prepared in Example 5.

As previously mentioned, the herein described novel compositions produced in the above described manner are biologically active compounds which are useful and valuable in controlling various pest organisms. The compounds of this invention were tested in the following manner.

*Housefly evaluation test.*—The fly specie *Musca domestica* (Linn.) was subjected to evaluation tests for insecticides incorporating the compounds of the present invention.

Twenty-five female flies, three to five days old, were caged in cardboard mailing tubes ⅜″ in diameter and 2⅝″ tall. The cages were supplied with cellophane bottoms and coarse mesh nylon tops. Each cage was provided with food and water. The candidate toxicant was dissolved in a volatile solvent, preferably acetone. The solution was pipetted into a petri dish bottom, allowed to air dry and placed in a cardboard mailing tube cage. The flies were continuously exposed to the known residue of the active compound in the cage. After twenty-four and forty-eight hours, counts were made to determine living and dead insects. The LD–50 values were calculated using well-known procedures. These data are given in Table II.

TABLE II.—INSECTICIDAL EVALUATION ACTIVITY

Housefly LD–50 (*Musca domestica*),

| Compound number: | μg. |
|---|---|
| 1 | 15 |
| 2 | 75 |
| 3 | 35 |
| 4 | 40 |
| 5 | 10 |
| 6 | 20 |
| 7 | 5 |
| 8 | 10 |
| 9 | 15 |

It was also found that 5-(N-methylcarbamoyloxy) benzodioxane and 5-(N-methylcarbamoyloxy)ethyl benzodioxane effectively controlled milkweed bug at a concentration of 0.005 percent and lygus bug at .003 percent. Also N-methyl(m-methylthiomethoxy)phenyl carbamate and N-methyl-(m-methylthioethoxy)phenyl carbamate offered effective control of lygus bug at 0.0005 and 0.005 percent, respectively. Recently it has been noted that the lygus bug, a serious economic threat to many crops, is becoming more tolerant to DDT. Control of this sucking insect has become increasingly more difficult and the find of an effective insecticidal agent to control these insects is very valuable.

From these data it can be seen that these compounds are valuable as insecticides. In practice the compounds are usually formulated with an inert adjuvant, utilizing methods well-known to those skilled in the art, thereby making them suitable for application. They may be used in the form of emulsions, non-aqueous solutions, wettable powders, vapors, dusts, dips or the like, as may be best fitted to the particular utility. The concentration of a compound of the present invention, constituting an effective amount, and the best mode of administration to a pest or its habitat may be easily determined by those skilled in the art of insect control. The disclosure is not meant to limit the action of the compounds to one particular insect species or the mode of effect thereon. For example, N-methyl (m-methylthiomethoxy) phenyl carbamate is highly active against Black Bean Aphids and Red Spider mites.

Various changes and modifications may be made without departing from the spirit and scope of the invention described herein as will be apparent to those skilled in the art to which it pertains. It is accordingly intended that the present invention shall only be limited by the scope of the appended claims.

We claim:

1. The method of killing insects comprising applying to an insect habitat an effective amount of a compound having the formula

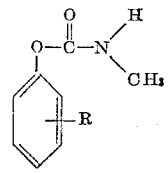

wherein R is a member selected from the group consisting of meta-oriented lower alkylthioalkoxy, para-oriented cyanomethyl, para-oriented cyanoethyl, 2,3-oriented ethylenedioxy, and 2,3-oriented lower alkyl ethylenedioxy.

2. The method of killing insects comprising applying to an insect habitat an effective amount of the compound N-methyl-(m-methylthiomethoxy)phenyl carbamate.

3. The method of killing insects comprising applying to an insect habitat an effective amount of the compound N-methyl-(m-isopropylthiomethoxy)phenyl carbamate.

4. The method of killing insects comprising applying to an insect habitat an effective amount of the compound N-methyl-(m-methylthioethoxy)phenyl carbamate.

5. The method of killing insects comprising applying to an insect habitat an effective amount of the compound N-methyl-(p-cyanomethyl)phenyl carbamate.

6. The method of killing insects comprising applying to an insect habitat an effective amount of the compound 5-(N-methylcarbamoyloxy)benzodioxane.

7. An insecticidal composition comprising an inert insecticidal adjuvant and an effective amount of a compound having the formula

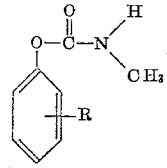

wherein R is a member selected from the group consisting of meta-oriented lower alkylthioalkoxy, para-oriented cyanomethyl, para-oriented cyanoethyl, 2,3-oriented ethylenedioxy, and 2,3-oriented lower alkyl ethylenedioxy.

8. An insecticidal composition comprising an inert insecticidal adjuvant and an effective amount of the compound N-methyl-(m-methylthiomethoxy)phenyl carbamate.

9. An insecticidal composition comprising an inert insecticidal adjuvant and an effective amount of the compound N-methyl-(m-isopropylthiomethoxy)phenyl carbamate.

10. An insecticidal composition comprising an inert insecticidal adjuvant and an effective amount of the compound N-methyl-(m-methylthioethoxy)phenyl carbamate.

11. An insecticidal composition comprising an inert insecticidal adjuvant and an effective amount of the compound N-methyl-(p-cyanomethyl)phenyl carbamate.

12. An insecticidal composition comprising an inert insecticidal adjuvant and an effective amount of the compound 5-(N-methylcarbamoyloxy)benzodioxane.

No references cited.

JULIAN S. LEVITT, *Primary Examiner.*
STANLEY J. FRIEDMAN, *Assistant Examiner.*